(12) United States Patent
Metke et al.

(10) Patent No.: US 8,001,381 B2
(45) Date of Patent: Aug. 16, 2011

(54) METHOD AND SYSTEM FOR MUTUAL AUTHENTICATION OF NODES IN A WIRELESS COMMUNICATION NETWORK

(75) Inventors: Anthony E. Metke, Naperville, IL (US); Adam C. Lewis, Buffalo Grove, IL (US); George Popovich, Palatine, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 770 days.

(21) Appl. No.: 12/037,516

(22) Filed: Feb. 26, 2008

(65) Prior Publication Data
US 2009/0217043 A1    Aug. 27, 2009

(51) Int. Cl.
*H04L 9/28* (2006.01)
*H04K 1/00* (2006.01)
(52) U.S. Cl. ......... 713/169; 713/175; 713/176; 380/259
(58) Field of Classification Search .................. None
See application file for complete search history.

(56) References Cited

U.S. PATENT DOCUMENTS

| | | | |
|---|---|---|---|
| 4,200,770 A | 4/1980 | Hellman et al. | |
| 6,886,095 B1 | 4/2005 | Hind et al. | |
| 7,395,427 B2* | 7/2008 | Walker | 713/169 |
| 7,587,201 B2* | 9/2009 | Ohara | 455/423 |
| 7,694,329 B2* | 4/2010 | McGarvey et al. | 726/8 |
| 7,697,737 B2* | 4/2010 | Aull et al. | 382/124 |
| 2002/0165912 A1* | 11/2002 | Wenocur et al. | 709/203 |
| 2002/0178360 A1* | 11/2002 | Wenocur et al. | 713/170 |
| 2002/0194483 A1* | 12/2002 | Wenocur et al. | 713/185 |
| 2002/0194501 A1* | 12/2002 | Wenocur et al. | 713/201 |
| 2002/0196935 A1* | 12/2002 | Wenocur et al. | 380/37 |
| 2002/0199001 A1* | 12/2002 | Wenocur et al. | 709/227 |
| 2004/0006705 A1 | 1/2004 | Walker | |
| 2005/0216736 A1* | 9/2005 | Smith | 713/168 |

(Continued)

FOREIGN PATENT DOCUMENTS

WO        0184763 A2    11/2001

(Continued)

OTHER PUBLICATIONS

D. Eastlake, 3rd, J. Schiller and S. Crocker—"Randomness Requirements for Security"—Request for Comments (Proposed Standard) 4086, Internet Engineering Task Force, Jun. 2005, 47 pages.

(Continued)

*Primary Examiner* — Christopher A Revak
(74) *Attorney, Agent, or Firm* — Randi L. Karpinia

(57) ABSTRACT

A method as provided enables mutual authentication of nodes in a wireless communication network. The method includes processing at a first node a beacon message received from a second node, wherein the beacon message comprises a first nonce value (step 405). An association request message comprising a certificate of the first node, a first signed block of authentication data, and a second nonce value is then transmitted from the first node to the second node (step 410). The second node can then verify a signature of the certificate of the first node and verify a signature of the first signed block of authentication data. An association reply message received from the second node is then processed at the first node (step 415), whereby the first node verifies a signature of a certificate of the second node and verifies a signature of a second signed block of authentication data.

16 Claims, 5 Drawing Sheets

U.S. PATENT DOCUMENTS

| | | | |
|---|---|---|---|
| 2006/0007935 A1* | 1/2006 | Bennett et al. | 370/395.5 |
| 2006/0129807 A1* | 6/2006 | Halasz et al. | 713/163 |
| 2006/0166718 A1* | 7/2006 | Seshadri et al. | 455/575.2 |
| 2010/0161817 A1* | 6/2010 | Xiao et al. | 709/229 |
| 2010/0161966 A1* | 6/2010 | Kwon et al. | 713/155 |
| 2010/0332839 A1* | 12/2010 | Dare et al. | 713/175 |

FOREIGN PATENT DOCUMENTS

| | | | |
|---|---|---|---|
| WO | WO 01/84763 | * | 11/2001 |
| WO | 2008002081 A1 | | 1/2008 |

OTHER PUBLICATIONS

A. Menezes, P. van Oorschot and S. Vanstone—Handbook of Applied Cryptography—Chapter 12, 12.5.2 (iv) X.509 Strong Authentication Protocols—CRC Press, 1996—pp. 510-511.

PCT/US2009/034184—EPC International Search Report—Mailed Aug. 18, 2009—12 pages.

Diffie et al., "New Directions in Cryptography," IEEE Trans. Info. Theory IT-22, 6, 1976, pp. 644-654.

* cited by examiner

US 8,001,381 B2

METHOD AND SYSTEM FOR MUTUAL AUTHENTICATION OF NODES IN A WIRELESS COMMUNICATION NETWORK

FIELD OF THE DISCLOSURE

The present invention relates generally to wireless communication networks, and in particular to providing rapid mutual authentication between network nodes.

BACKGROUND

Many wireless communication systems require a rapid deployment of independent mobile users as well as reliable communications between user nodes. Mesh networks, such as Mobile Ad Hoc Networks (MANETs), are based on self-configuring autonomous collections of portable devices that communicate with each other over wireless links having limited bandwidths. A mesh network is a collection of wireless nodes or devices organized in a decentralized manner to provide range extension by allowing nodes to be reached across multiple hops. In a mesh network, communication packets sent by a source node thus can be relayed through one or more intermediary nodes before reaching a destination node. Mesh networks may be deployed as temporary packet radio networks that do not involve significant, if any, supporting infrastructure. Rather than employing fixed base stations, in some mesh networks each user node can operate as a router for other user nodes, thus enabling expanded network coverage that can be set up quickly, at low cost, and which is highly fault tolerant. In some mesh networks, special wireless routers also may be used as intermediary infrastructure nodes. Large networks thus can be realized using intelligent access points (IAPs), also known as gateways or portals, which provide wireless nodes with access to a wired backhaul or wide area network (WAN).

Mesh networks can provide critical communication services in various environments involving, for example, emergency services supporting police and fire personnel, military applications, industrial facilities and construction sites. Mesh networks are also used to provide communication services in homes, in areas with little or no basic telecommunications or broadband infrastructure, and in other areas with demand for high speed services (e.g., universities, corporate campuses, and dense urban areas).

However, establishing secure communications between nodes in a mesh communication network can be complex. Conventional mobile devices such as cellular phones often obtain communication security using infrastructure-based authentication processes. Devices are generally authenticated through an Access Point (AP), such as a base station, which is connected to an authentication server. An authentication request can be transmitted for example using an Extensible Authentication Protocol (EAP) comprising EAP Over Local Area Network (EAPOL) packets. The authentication process involves several EAPOL packets being transmitted and received, beginning with an EAP Start packet and finishing with either an EAP Success message packet or an EAP Failure message packet. The authentication server stores the authentication credentials of a mobile device (typically called a supplicant) that is being authenticated. Authentication servers also can be connected to other authentication servers to obtain supplicant authentication credentials that are not stored locally.

In infrastructure-based mobile networks, a centralized procedure is often followed where a single AP handles an authentication process for all supplicants within range of the AP. For example, prior systems which adhere to American National Standards Institute/Institute of Electrical and Electronics Engineers (ANSI/IEEE) 802.1X or ANSI/IEEE 802.11i standards utilize such a centralized procedure (see: http://standards.ieee.org/getieee802/index.html or contact the IEEE at IEEE, 445 Hoes Lane, PO Box 1331, Piscataway, N.J. 08855-1331, USA). However, because every supplicant can be authenticated only via an AP, such a centralized procedure is not practical in wireless mesh communication networks, which often have nodes operating outside of the wireless range of an Intelligent AP (IAP). Wireless mesh communication networks thus often involve complex mutual authentication methods performed between all neighboring network nodes, which can consume significant time and processor resources of the network nodes.

Accordingly, there is a need for an improved method and system for mutual authentication of nodes in a wireless communication network.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
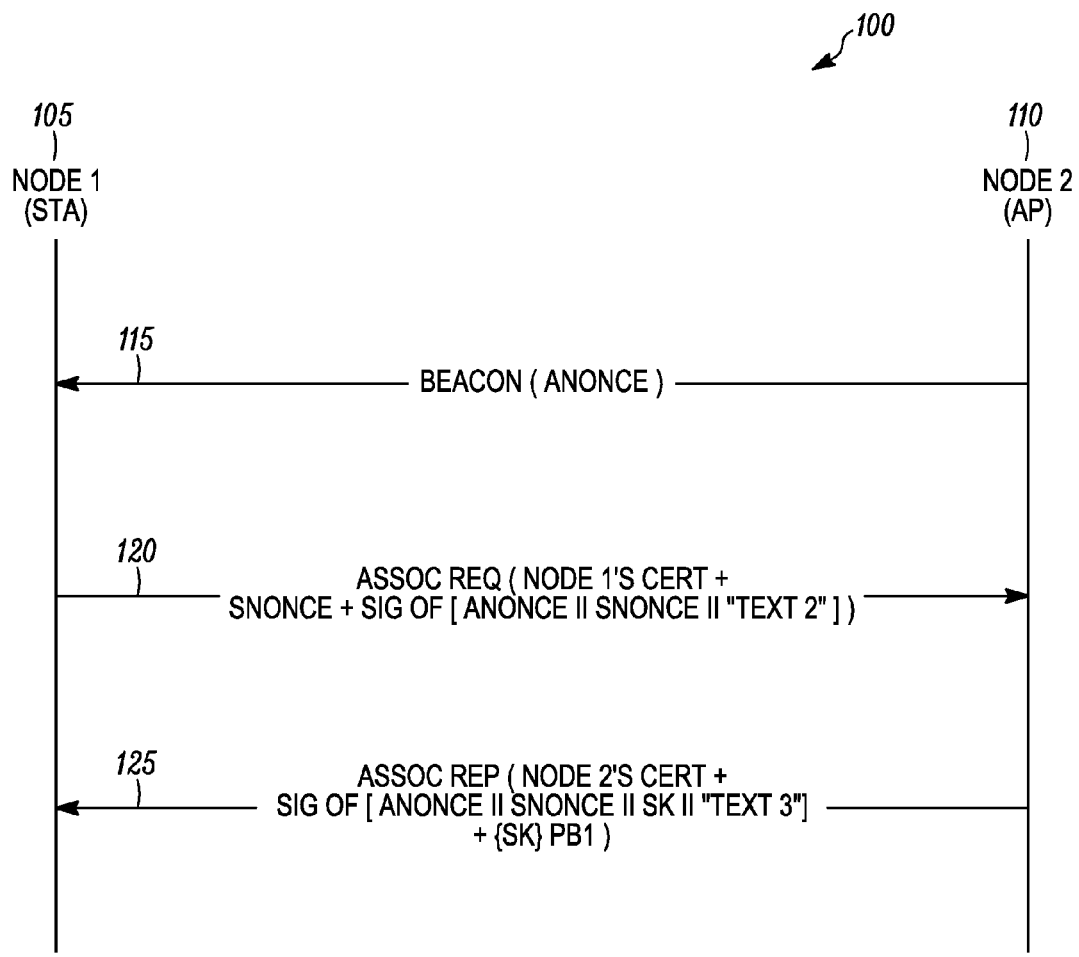
FIG. 1 is a message sequence chart illustrating a method for mutual authentication of a first node and a second node in a wireless communication network, according to some embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, the present invention is a method for mutual authentication of a first node and a second node in a wireless communication network. The method includes processing at the first node a beacon message received from the second node, wherein the beacon message comprises a first nonce value. An association request message comprising a certificate of the first node, a first signed block of authentication data, and a second nonce value is then transmitted from the first node to the second node. The second node can then verify a signature of the certificate of the first node and verify a signature of the first signed block of authentication data. An association reply message received from the second node is then processed at the first node. The association reply message comprises a certificate of the second node, a second signed block of authentication data, and first random keying data encrypted using a public key of the first node, whereby the first node verifies a signature of the certificate of the second node and verifies a signature of the second signed block of authentication data.

Thus, according to the method described above, some embodiments of the present invention enable a fast mutual authentication and key exchange between network nodes. An "attachment time period" between when two nodes in a wireless communication network discover each other and when they are able to communicate securely often must be minimized. For example, in some circumstances such as highly mobile dynamic networks having limited cell sizes, such an attachment time period may be required to be less than 100 milliseconds. However, two-party authentication processes according to the prior art sometimes require as many as eleven messages to be exchanged between the parties. For example, such messages may include one beacon message, two association messages, four Transport Layer Security (TLS) messages, and four messages in a four-way handshake. Exchanging such a high number of messages can be time consuming, and may result in excessively long attachment time periods.

Referring to FIG. 1, a message sequence chart illustrates a method for mutual authentication of a first node 105 and a second node 110 in a wireless communication network 100, according to some embodiments of the present invention. Consider for example that the wireless communication network 100 is a wireless mesh network, and the first node 105 and the second node 110 discover each other and need to complete a two-party authentication process. For illustration purposes, consider that the first node 105 initiates an association request and thus represents a station (STA), and the second node 110 receives an association request and thus represents an access point (AP). First, although either the first node 105 or the second node 110 is likely to be able to transmit beacon messages, a beacon message 115 including a first nonce value (ANonce) is transmitted from the second node 110 to the first node 105.

As is known by those having ordinary skill in the art, a nonce value is a random or pseudo-random number used to ensure that old communications cannot be reused in replay attacks. Typical methods of implementing a nonce value include using a sequence number (which is a monotonically increasing number that is incremented for each iteration of a protocol), or a large random number (chosen such that a probability of reuse is sufficiently small), or a time-stamp value.

Further, in this specification the term "beacon" is used to refer to a periodic unsolicited message that is transmitted by a first node to inform other nodes of, for example, operational parameters, other status information, settings, or the presence of the first node. The term "beacon" also includes a solicited response, such as a poll response, to a request for information such as operational parameters, other status information, settings, or the presence of a node.

If the first node 105 intends to associate with the second node 110, the first node 105 replies by transmitting an association request message 120 to the second node 110. The association request message 120 comprises a certificate of the first node 105, a first signed block of authentication data, and a second nonce value (SNonce). The second node 110 can then verify a signature of the certificate of the first node 105 and verify a signature of the first signed block of authentication data.

The second node 110 then responds by transmitting an association reply message 125 to the first node 105. The association reply message comprises a certificate of the second node 110, a second signed block of authentication data, and first random keying data encrypted using a public key of the first node 105. For example, the second node 110 can sign the second nonce value (SNonce) and other data, and include in the association reply message 125 a session key (SK) encrypted using a public key (Pb1) of the first node 105, where the Pb1 was included in the certificate of the first node 105 in the association request message 120. If the first node 105 does not receive the association reply message 125, then the first node 105 retransmits the association request message 120. Various methods, such as those described in D. Eastlake, 3rd, J. Schiller, and S. Crocker. *Randomness Requirements for Security. Request for Comments (Proposed Standard)* 4086, *Internet Engineering Task Force*, June 2005, which document is hereby incorporated by reference in its entirety herein, can be used to ensure that a necessary entropy is available to generate a sufficiently random session key (SK).

After receiving the association reply message 125, the first node 105 can then verify that the second node 110 holds the private key associated with a certificate of the second node 110. The first node 105 can also decrypt the session key (SK) using a private key of the first node 105. The session key (SK) then can be used as a pairwise master key (PMK) for a security association between the first node 105 and the second node 110. Encrypted data then can be exchanged in either direction between the first node 105 and the second node 110.

The association request message 120 thus can be used to completely authenticate a STA with an AP. That is because the association request message 120 also includes the certificate of the STA, and a signature of the first nonce value (ANonce), and other data, from the preceding beacon message 115. After receiving the association request message 120, the AP (the second node 110) can validate the certificate of the STA (the first node 105), assuming that the AP has the public key of a certification authority (CA) that signed the certificate. If the STA's certificate is determined to be valid, the AP can determine whether the STA has the associated private key by verifying the signature included in the association request message 120, and thus prove an authenticity of the STA. The AP can then determine whether the STA is authorized to use the wireless communication network 100. The association request message 120 also includes the second nonce value (SNonce) that the STA uses to prove its identity to the AP.

A malicious interception of the association reply message 125 could result in a substitution of the session key (SK) with a second session key (SK'), since the public key of the first node 105 is not secret. However, a malicious interceptor would not be able to sign the second nonce value (SNonce) because that requires knowledge of the private key of the second node 110.

Alternatively, it is possible to complete a virtual four-way handshake by including an additional pair of nonce values in an association request message (e.g., SNonce1 and SNonce2) and in an association reply message (e.g., ANonce1 and ANonce 2). The first nonce value and second nonce value (SNonce1 and ANonce1, respectively) are used as described above to complete an authentication, and the third nonce value and fourth nonce value (SNonce2 and ANonce2, respectively) are used to complete the virtual four-way handshake and derive a pairwise transient key (PTK) from the PMK. For example, such a PTK could be generated according to the method defined in the Institute of Electrical and Electronics Engineers (IEEE) standard 802.11i, which document is hereby incorporated by reference in its entirety herein. (Any IEEE standards or specifications referred to herein may be obtained at http://standards.ieee.org/getieee802/index.html or by contacting the IEEE at IEEE, 445 Hoes Lane, PO Box 1331, Piscataway, N.J. 08855-1331, USA.) Specifically, the PTK can be generated using the following equation:

$$PTK=PRF\text{-}X(PMK,\text{"Pairwise key expansion"},Min(AA,SPA)\|Max(AA,SPA)\|Min(ANonce2,SNonce2)\|Max(ANonce2,SNonce2)),\qquad(Eq.\ 1)$$

where: the value of SK is used for the PMK, Max (x,y) is the maximum of x and y, Min (x,y) is the minimum of x and y, AA is Authenticator Address (i.e the second node), and SPA is the Supplicant Address (i.e the first node), and "∥" denotes concatenation.

PRF-X is a pseudo-random function (PRF) that hashes various inputs to return a seemingly random (or pseudo-random) value. One commonly used PRF is defined by the IEEE standard 802.11i, and a simplified version of this PRF is described below.

A PRF can be used to provide a variable number of output bits. The IEEE standard 802.11 defines five PRFs: PRF-128, which outputs 128 bits; PRF-192, which outputs 192 bits; PRF-256, which outputs 256 bits; PRF-384, which outputs 384 bits; and PRF-512, which outputs 512 bits. For simplicity, only PRF-128 is defined below.

PRF-128 is defined as:

```
PRF-128(K, A, B)          /* Function PRF-128 has inputs K,
A, and B    */
    R ← HMAC-SHA-1(K, A ∥ Y ∥ B ∥ Y)   /* Set R equal to Hash of K
with A∥Y∥B∥Y   */
return L(R, 0, 128)        /* Return the first 128 bits of the
Hash        */
``` where: Y is a single octet containing 0, HMAC-SHA-1 is a keyed-Hash Message Authentication Code such as is defined by the Internet Engineering Task Force (IETF) document "RFC 2104", and L(R, 0, 128) returns the first 128 bits of R. In examples described herein, K is set equal to the value of the PMK (i.e., the SK), the value of A is equal to the string "Pairwise key expansion", and the value of B is equal to [Min (AA,SPA)∥Max (AA,SPA)∥Min (ANonce2, SNonce2)∥Max (ANonce2, SNonce2)].

Figure 2:
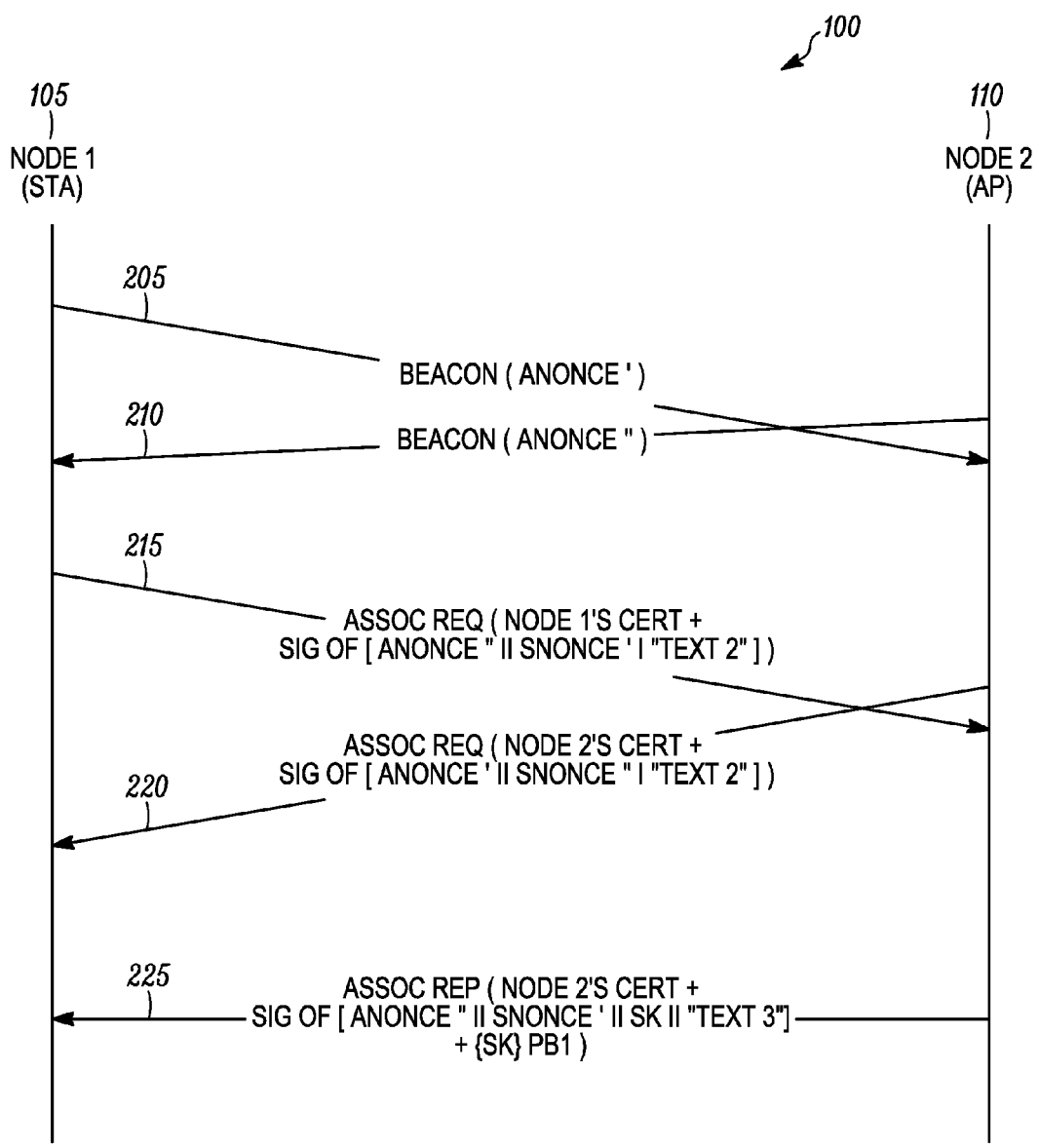
FIG. 2 is a message sequence chart illustrating a further method for mutual authentication of a first node and a second node in a wireless communication network, according to some embodiments of the present invention.

Referring to FIG. 2, a message sequence chart illustrates a further method for mutual authentication of the first node 105 and the second node 110 in the wireless communication network 100, according to some embodiments of the present invention. Consider that the first node 105 transmits a first beacon message 205 to the second node 110 at nearly the same time as the second node 110 transmits a second beacon message 210 to the first node 105. The first node 105 thus responds to the second beacon message 210 by transmitting a first association request message 215, and the second node 110 responds to the first beacon message 205 by transmitting a second association request message 220.

Next, both the first node 105 and the second node 110 become aware that they have received both a beacon message (210 or 205, respectively) and an association response message (220 or 215, respectively). Therefore a determination must be made concerning which node will function as an access point (AP) and which node will function as a station (STA) for purposes of mutual authentication. For example, the first node 105 and the second node 110 can simply identify which node has a smaller medium access control (MAC) address. If the second node 110 determines that it has a smaller MAC address than the first node 105, then the second node 110 transmits an association reply message 225 to the first node 105. Further, if the first node 105 determines that it has a larger MAC address than the second node 110, then the first node 105 terminates the authentication mechanism initiated by the association request message 215. Processing of the association reply message 225 then proceeds similarly to the processing of the association reply message 125 described above.

Figure 3:
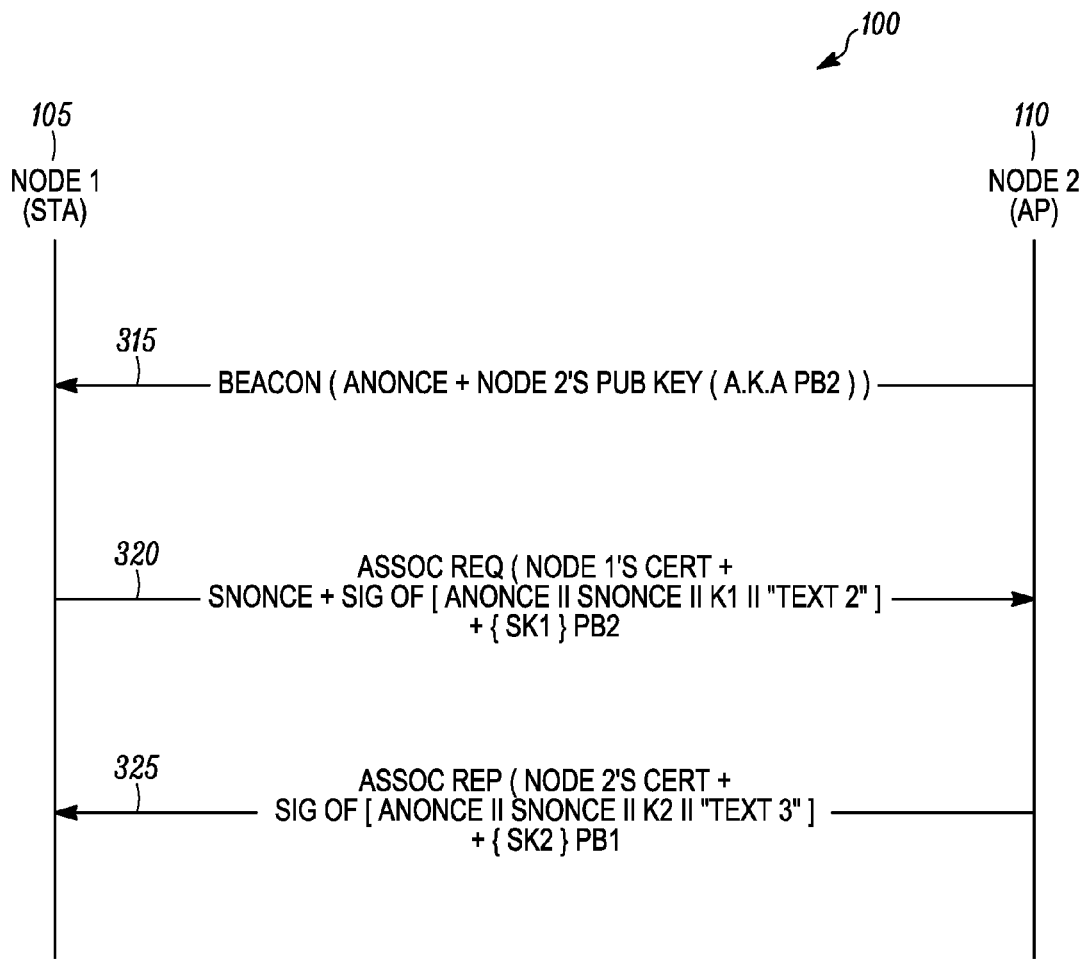
FIG. 3 is a message sequence chart illustrating another method for mutual authentication of a first node and a second node in a wireless communication network, according to some embodiments of the present invention.

Referring to FIG. 3, a message sequence chart illustrates a further method for mutual authentication of the first node 105 and the second node 110 in the wireless communication network 100, according to some embodiments of the present invention. Again, consider that the first node 105 initiates an association request and thus represents a station (STA), and the second node 115 receives an association request and thus represents an access point (AP).

First, a beacon message 315 including a first nonce value (ANonce) and a public key (Pb2) of the second node 110 is transmitted from the second node 110 to the first node 105. If the first node 105 intends to associate with the second node 110, the first node 105 replies by transmitting an association request message 320 to the second node 110. The association request message 320 comprises a certificate of the first node 105, a second nonce value (SNonce), and a first signed block of authentication data. The first signed block of authentication data comprises a signature of both the ANonce and the SNonce, some predetermined application specific text, and provisional keying data (SK1) encrypted using the public key (Pb2) of the second node 110. SK1 is considered provisional because the first node 105 sends SK1 to the second node 110 before the first node 105 authenticates the second node 110. The second node 110 can then verify that the first node 105 holds a private key associated with the public key in the certificate of the first node 105.

The second node 110 then responds by transmitting an association reply message 325 to the first node 105. The association reply message comprises a certificate of the second node 110, a second signed block of authentication data, and first random keying data encrypted using a public key of the first node 105. For example, the second node 110 can sign the second nonce value (SNonce) and other data, and include in the association reply message 125 remote keying data (SK2) encrypted using a public key (Pb1) of the first node 105.

The first node 105 can then verify that the second node 110 holds a private key associated with the certificate of the second node 110. If such verification fails (e.g., if the certificate of the second node 110 is not valid or the signature in the association reply message 325 is not valid), then the first node 105 will terminate the authentication session.

According to some embodiments of the present invention, the session keys SK1 and SK2 can be Diffie-Hellman (D-H) parameters $g^a \bmod p$ and $g^b \bmod p$, respectively, where p is a chosen prime number, and g is a "primitive root mod p" (also known as a Diffie-Hellman "base"). The variables a and b are integers, known as secret integers, where only the first node 105 knows a and only the second node 110 knows b. As will be understood by those having ordinary skill in the art, such Diffie-Hellman parameters concern a well-known cryptographic protocol that allows two parties that have no prior knowledge of each other to jointly establish a shared secret key over an insecure communication channel. For example, see U.S. Pat. No. 4,200,770 to Hellman, et. al., titled "Cryptographic Apparatus and Method", and W. Diffie and M. E. Hellman, "New directions in cryptography," IEEE Trans. Inform. Theory, IT-22, 6, 1976, pp. 644-654, which documents are hereby incorporated by reference in their entirety herein. The variables a and b can be randomly selected at the second node 110 (AP) and first node 105 (STA), respectively. The variables g and p can be preconfigured, or included in the beacon message 315. Alternatively, a new field in the beacon message 315 can indicate one of a preconfigured set of g and p variables to use. In such case, the session key SK1 is signed by the private key of the first node 105, rather than encrypted with the public key of the second node 110. Similarly, the session key SK2 is signed by the private key of the second node 110, rather than encrypted with the public key of the first node 105.

According to still other embodiments of the present invention, the association reply messages 125, 225, or 325 can include data. Also, the second node 110 (AP) can include a list of trust anchors in the beacon messages 115, 210 or 315 or a list of trust anchors in the association reply messages 125, 225, or 325. Further, the second node 110 (AP) can include its public key certificate in the beacon messages 115, 210, or 315 or in the association reply messages 125, 225, or 325. The first node 105 (STA) also can include a request in the association request message 120, 215, or 320 that the second node (AP) include either a trust anchor list, an AP certificate, or both in the association reply messages 125, 225, or 325, respectively. Further, according to some embodiments of the present invention, the signatures contained in the association request messages 120, 215, or 320 and association reply messages 125, 225, or 325 additionally include the MAC addresses of the first node 105 and the second node 110. For example, such messages may appear as follows: Assoc Req (Node 1's Cert+SNonce+sig of [ANonce∥SNonce∥MAC 1∥MAC 2∥SK1∥"text 2"]+{SK1}Pb2); and Assoc Rep (Node 2's Cert+sig of [ANonce∥SNonce∥MAC 1∥MAC 2∥SK2∥"text 3"]+{SK2}Pb1).

As will be understood by those having ordinary skill in the art, more descriptive text can be used in signed data, rather than the text illustrated in the present figures. For example, "Fast authentication message 2" can be used for "text 2", and "Fast authentication message 3" can be used for "text 3".

Figure 4:
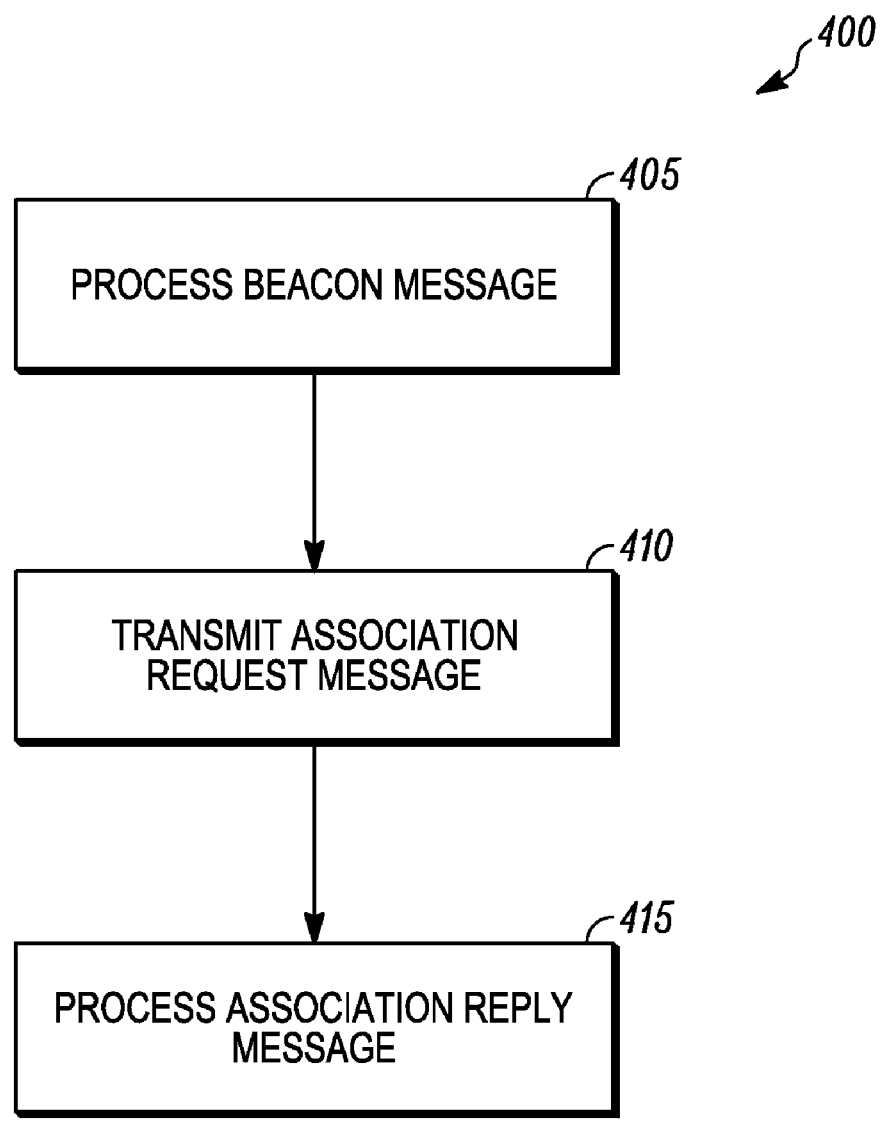
FIG. 4 is a general flow diagram illustrating a method for mutual authentication of a first node and a second node in a wireless communication network, according to some embodiments of the present invention.

Referring to FIG. 4, a general flow diagram illustrates a method 400 for mutual authentication of a first node and a second node in a wireless communication network, according to some embodiments of the present invention. At step 405, the first node processes a beacon message received from the second node, wherein the beacon message comprises a first nonce value. For example, as shown in FIG. 1, the first node 105 (STA) processes the beacon message 115 received from the second node 110 (AP).

At step 410, the first node transmits to the second node an association request message comprising a certificate of the first node, a first signed block of authentication data, and the second nonce value, whereby the second node can verify a signature of the certificate of the first node and verify a signature of the first signed block of authentication data. For example, as shown in FIG. 1, the first node 105 (STA) transmits to the second node 110 (AP) the association request message 120.

At step 415, the first node processes an association reply message received from the second node, wherein the association reply message comprises a certificate of the second node, a second signed block of authentication data, and first random keying data encrypted using a public key of the first node, whereby the first node verifies a signature of the certificate of the second node and verifies a signature of the second signed block of authentication data. For example, as shown in FIG. 1, the first node 105 (STA) processes the association reply message 125 received from the second node 110 (AP).

Figure 5:
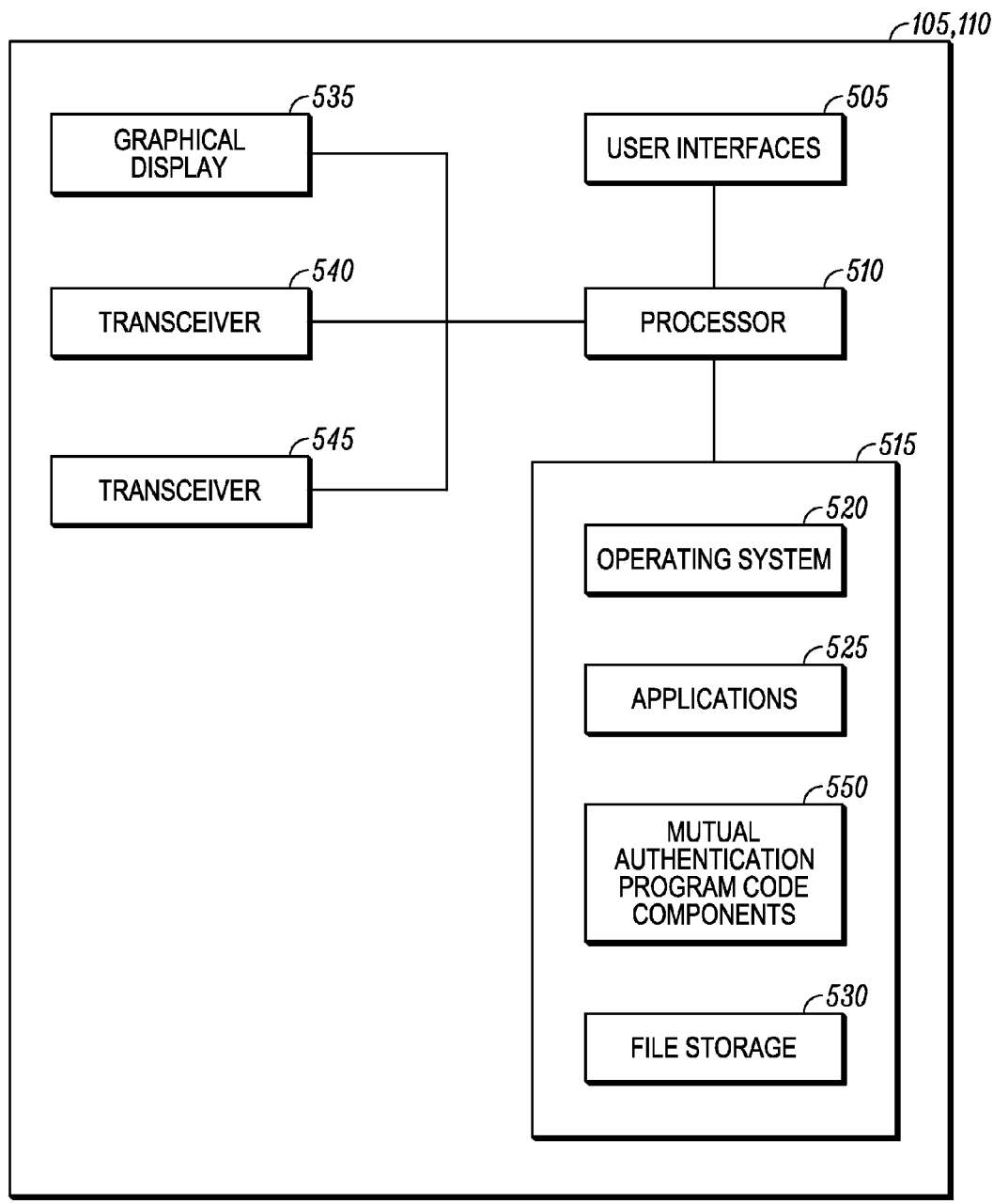
FIG. 5 is a block diagram illustrating components of a wireless communication device that can function as a first node or a second node in a wireless communication network, according to some embodiments of the present invention Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

Referring to FIG. 5, a block diagram illustrates components of a wireless communication device that can function as the first node 105 or the second node 110 in the wireless communication network 100, according to some embodiments of the present invention. The first node 105 or the second node 110 can be, for example, a two-way radio, a mobile telephone, a notebook computer, or another type of device operating as a Worldwide Interoperability for Microwave Access (WiMAX) vehicle modem, an Institute of Electrical and Electronics Engineers (IEEE) 802.11i modem, a mesh network vehicular modem, or other type of network node. The first node 105 or the second node 110 can comprise user interfaces 505 operatively coupled to at least one processor 510. At least one memory 515 is also operatively coupled to the processor 510. The memory 515 has storage sufficient for an operating system 520, applications 525 and general file storage 530. The general file storage 530 can store, for example, data associated with implementation of the present invention. The user interfaces 505 can be a combination of user interfaces including, for example, but not limited to a keypad, a touch screen, a microphone and a communications speaker. A graphical display 535, which can also have a dedicated processor and/or memory, drivers, etc., is operatively coupled to the processor 510. A number of transceivers, such as a first transceiver 540 and a second transceiver 545, are also operatively coupled to the processor 510. The first transceiver 540 and the second transceiver 545 communicate with various wireless communications networks, such as the wireless communication network 100, using various standards such as, but not limited to, Evolved Universal Mobile Telecommunications Service Terrestrial Radio Access (E-UTRA), Universal Mobile Telecommunications System (UMTS), Enhanced UMTS (E-UMTS), Enhanced High Rate Packet Data (E-HRPD), Code Division Multiple Access 2000 (CDMA2000), Institute of Electrical and Electronics Engineers (IEEE) 802.11, IEEE 802.16, and other standards.

It is to be understood that FIG. 5 is for illustrative purposes only and includes only some components of the first node 105 or the second node 110, in accordance with some embodiments of the present invention, and is not intended to be a complete schematic diagram of the various components and connections between components required for all devices that may implement various embodiments of the present invention.

The memory 515 comprises a computer readable medium that records the operating system 520, the applications 525, and the general file storage 530. The computer readable medium also comprises computer readable program code components 550 concerning mutual authentication. When the computer readable program code components 550 are processed by the processor 510, they can be configured to cause execution of the method 400 for mutual authentication, as described above, according to some embodiments of the present invention.

Advantages of the present invention thus include enabling a rapid mutual authentication process between two nodes that discover each other in a wireless communication network. According to some embodiments of the present invention, association, authentication and key derivation processes can be combined into one process, significantly reducing a required "attachment time period". Fast attachment time periods then enable effective, highly mobile, and dynamic wireless communication networks.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, or contains a list of elements does not include only those elements but may include other elements not expressly listed or inherent to such process, method, article, or apparatus. An element preceded by "comprises a . . . ", "has a . . . ", "includes a . . . ", or "contains a . . . " does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for mutual authentication of a first node and a second node in a wireless communication network, the method comprising:
   processing at the first node a beacon message received from the second node, wherein the beacon message comprises a first nonce value;
   transmitting from the first node to the second node an association request message comprising a certificate of the first node, a first signed block of authentication data, a second nonce value, and a third nonce value, whereby the second node can verify a signature of the certificate of the first node and verify a signature of the first signed block of authentication data;
   processing at the first node an association reply message received from the second node, wherein the association reply message comprises a certificate of the second node, a second signed block of authentication data, a fourth nonce value, and a first random keying data including a pairwise master key of the second node encrypted using a public key of the first node, whereby the first node verifies a signature of the certificate of the second node and verifies a signature of the second signed block of authentication data; and
   generating at the first node a pairwise transient key from the pairwise master key using the third nonce value and the fourth nonce value.

2. The method of claim 1, wherein the first signed block of authentication data comprises at least one of a medium access control address of the first node, a medium access control address of the second node, a nonce value generated by the second node, or a text string.

3. The method of claim 1, wherein the association request message comprises a request for the second node to include at least one of a trust anchor list or an access point certificate in the association reply message.

4. The method of claim 1, wherein the beacon message further comprises a public key.

5. The method of claim 1, wherein the association request message further comprises provisional keying data encrypted with a public key of the second node.

6. The method of claim 5, wherein processing the association reply message further comprises generating provisional keying data and deriving a shared secret from both remote keying data and the provisional keying data.

7. The method of claim 6, wherein the provisional keying data and the remote keying data comprise Diffie-Hellman parameters.

8. The method of claim 1, wherein the first random keying data are signed by a private key of the second node.

9. The method of claim 1, wherein the beacon message further comprises a public key certificate of the second node (AP).

10. A system for mutual authentication of a first node and a second node in a wireless communication network, the system comprising:
- a computer readable non-transitory medium having computer readable program code components for processing at the first node a beacon message received from the second node, wherein the beacon message comprises a first nonce value;
- a computer readable non-transitory medium having computer readable program code components for transmitting from the first node to the second node an association request message comprising a certificate of the first node, a first signed block of authentication data, a second nonce value, and a third nonce value, whereby the second node can verify a signature of the certificate of the first node and verify a signature of the first signed block of authentication data;
- a computer readable non-transitory medium having computer readable program code components for processing at the first node an association reply message received from the second node, wherein the association reply message comprises a certificate of the second node, a second signed block of authentication data, a fourth nonce value, and a first random keying data including a pairwise master key of the second node encrypted using a public key of the first node, whereby the first node verifies a signature of the certificate of the second node and verifies a signature of the second signed block of authentication data; and
- a computer readable non-transitory medium having computer readable program code components for generating at the first node a pairwise transient key from the pairwise master key using the third nonce value and the fourth nonce value.

11. The system of claim 10, wherein the first signed block of authentication data comprises at least one of a medium access control address of the first node, a medium access control address of the second node, a nonce value generated by the second node, or a text string.

12. The system of claim 10, wherein the beacon message further comprises identifications of nodes in the wireless communication network that are trusted by the second node.

13. The system of claim 10, wherein the beacon message further comprises a public key.

14. The system of claim 10, wherein the association request message further comprises provisional keying data encrypted with a public key of the second node.

15. The system of claim 14, wherein processing the association reply message further comprises generating provisional keying data and deriving a shared secret from both remote keying data and the provisional keying data.

16. The system of claim 10, wherein the first random keying data are signed by a private key of the second node.

* * * * *